United States Patent [19]

Hashimoto

[11] Patent Number: 4,903,289
[45] Date of Patent: Feb. 20, 1990

[54] TELEPHONE EQUIPMENT WITH MULTIPLE FUNCTION

[75] Inventor: Kazuo Hashimoto, Tokyo, Japan

[73] Assignee: Hashimoto Corporation, Tokyo, Japan

[21] Appl. No.: 172,393

[22] Filed: Mar. 24, 1988

[30] Foreign Application Priority Data

Mar. 24, 1987 [JP] Japan .................. 62-70009

[51] Int. Cl.⁴ ............... H04M 1/64; H04M 11/00
[52] U.S. Cl. ...................... 379/61; 379/67; 379/77; 379/88
[58] Field of Search ............ 379/77, 61, 62, 110, 379/67, 88, 80, 105

[56] References Cited

U.S. PATENT DOCUMENTS

| | | | |
|---|---|---|---|
| 3,822,364 | 7/1974 | Lee | 379/387 |
| 4,517,410 | 5/1985 | Williams et al. | 379/73 |
| 4,538,031 | 8/1985 | Benning et al. | 379/103 |
| 4,571,457 | 2/1986 | Hattori et al. | 379/56 |
| 4,571,458 | 2/1986 | Bond | 379/77 |
| 4,625,079 | 11/1986 | Castro et al. | 379/77 |
| 4,677,655 | 6/1987 | Hashimoto | 379/61 |
| 4,682,957 | 7/1987 | Young | 434/307 |
| 4,731,814 | 3/1988 | Becker et al. | 379/62 |
| 4,761,806 | 8/1988 | Toki | 379/61 |

FOREIGN PATENT DOCUMENTS

| | | | |
|---|---|---|---|
| 0215850 | 12/1983 | Japan | 379/110 |
| 61-54749A | 3/1986 | Japan . | |
| 61-74440A | 4/1986 | Japan . | |
| 0147662 | 7/1986 | Japan | 379/77 |
| 62-18859A | 1/1987 | Japan . | |
| 2160390 | 6/1985 | United Kingdom . | |

OTHER PUBLICATIONS

"Digitaler Anrufbeantworter: Sprach-Menü", Funkschau, No. 7, Mar. 1983, pp. 61–63, Munich, Fed. Rep. of Germany; H.-G. Lüttmann et al.

*Primary Examiner*—Thomas W. Brown
*Attorney, Agent, or Firm*—Lowe, Price, LeBlanc, Becker & Shur

[57] ABSTRACT

Conventional telephone answering devices incorporated in or combined with a telephone set are now generally used. However, one type of conventional telephone set has a plurality of buttons, for instance, speed dialing, mute, flash or redial buttons, and further the telephone answering device incorporated in the telephone set has also many buttons for controlling the device. The user therefore is confused at the sight of a number of buttons and hesitates to use the device. Most conventional telephone answering devices can be remotely operated from a remote location by using the number keys, and asterisk and pound sign keys of a pushbutton telephone so as to rewind, fast forward, or record an outgoing or incoming message. The present invention makes common use of the pushbuttons for the telephone set and the telephone answering device, and also the telephone answering device can be manually operated at home in the same way as in remote control operation by using the same kinds of push phone buttons of an outside telephone set. The present invention also makes it possible to record a two-way conversation manually by use of some of the buttons during off-hook mode of telephone set.

6 Claims, 8 Drawing Sheets

Base device

Telephone answering device

FIG. 5a(ii)

Separate device

Hook switch

FIG. 5a(iii)

| Telephone set | Pushing key | DTMF output | Object | Telephone set |
|---|---|---|---|---|
| On - hook | 1<br>2<br>3 | A<br>B<br>C | Control of device | Not closed |
| Off - hook | 1<br>2<br>3 | 1<br>2<br>3 | Operation for calling the other party | Closed |

FIG.6

TELEPHONE EQUIPMENT WITH MULTIPLE FUNCTION

BACKGROUND OF THE INVENTION

The present invention relates to a telephone set with multiple functions.

A conventional telephone set with multiple functions is capable of off-hook dialing following picking up a handset, and also includes an on-hook dialing switch, a speed dialing switch, a repeat dialing switch, a mute button, a flash button etc. These functions usually use DTMF (dual-tone multifrequency) tones sent on a telephone line. When a device, for instance, a telephone answering device or the like is included in the telephone set, there is much inconvenience in practical use because the number of buttons will be excessively increased and a user will be confused when he or she attempts to operate the device manually at home or remotely at a remote location.

SUMMARY OF THE INVENTION

It is a first object of the present invention to make an operation of a device in a telephone set easy and safe by using a common means in remote and manual operation of the device by pushing the same keypad pushbuttons.

It is a second object of the present invention to make it possible to operate only an additional device in a telephone set independent of the telephone line by pushing some of buttons in an on-hook mode in carrying out the first object.

It is a third object of the present invention to make it possible to operate an additional device in a telephone set independent of the telephone line in carrying out the second object, whereby it can be done in an on-hook mode so that, when a user presses a security number at first, then the user can operate the device in the telephone set as he or she likes.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 5a and 5b are diagrams in the example of a cordless phone; and

DESCRIPTION OF THE PREFERRED EMBODIMENTS

The arrangement and operations in the preferred embodiments of the present invention will be now described.

Figure 1:
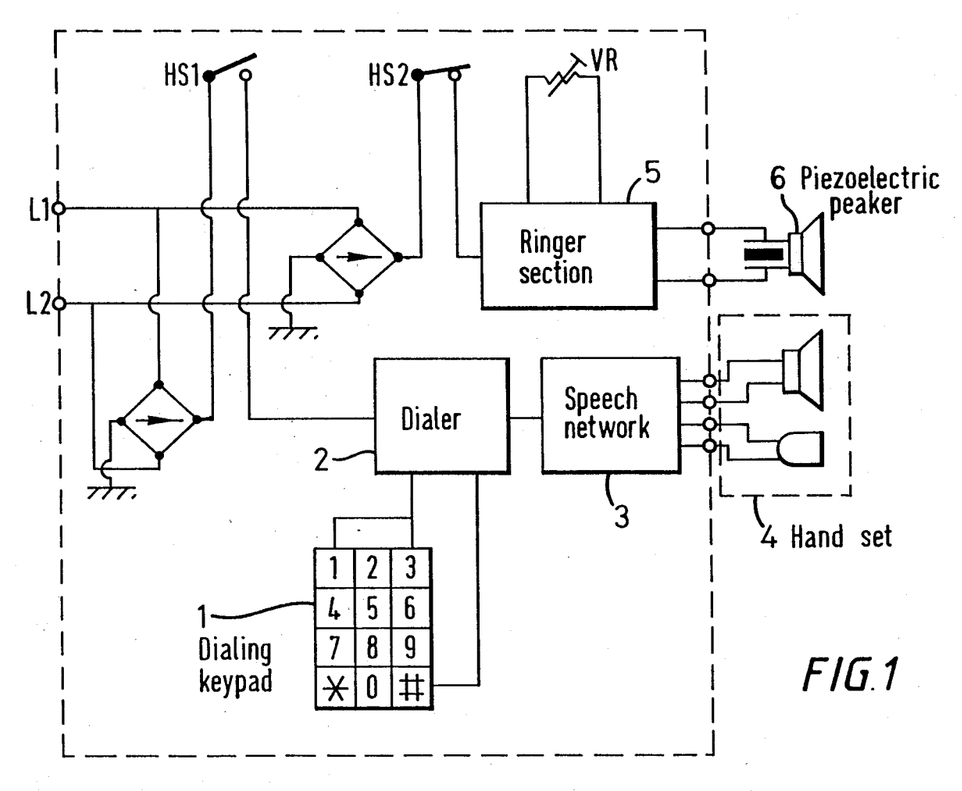
FIG. 1 is a circuit diagram which shows the main part of a conventional telephone set with multiple functions.

Referring to FIG. 1 which shows the main part of a conventional telephone set with multiple functions, reference numeral 1 denotes a dialing keypad; 2 denotes a dialer which generates a corresponding dial pulse or DTMF tone to lines L1 and L2 when a dialing key on the dialing keypad is turned on by a switch (not shown).

Reference numeral 3 denotes a speech network which enables establishing voice circuit through a handset 4. It is also, by a switch (not shown), possible to speak with the handset on hook.

Reference numeral 5 denotes a ringer for amplifying a tone ringer through a piezo-electric loudspeaker 6 which receives a ringing signal.

Reference symbols HS1 and HS2 denote hook switches.

As described above, FIG. 1 shows only the main part of the telephone set with multiple functions, wherein the DTMF tone generated in response to pushing of the dial key is used for making a call to a called party, and not for controlling a device incorporated in the telephone set.

Figure 2:
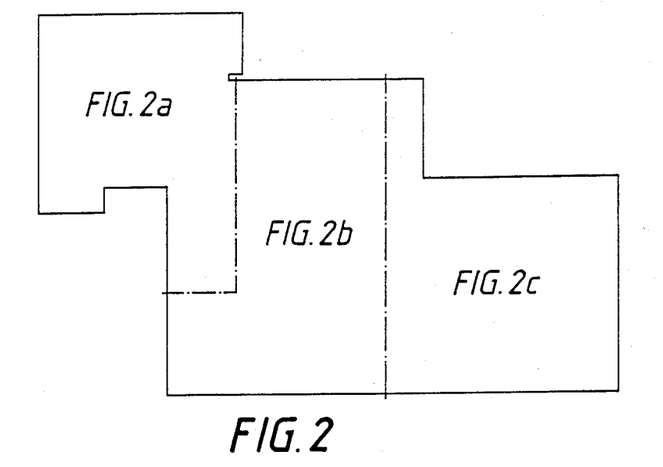
FIG. 2 is a circuit diagram which shows the main part of the present invention.
Figure 2A:
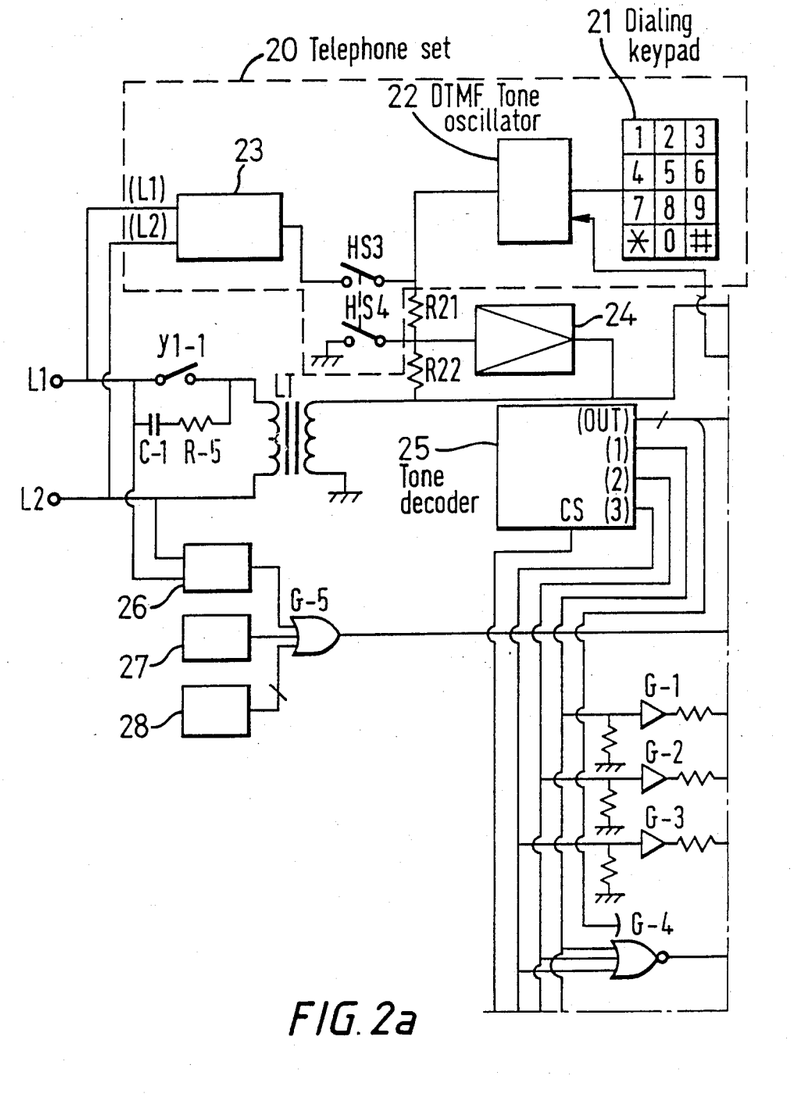
Figure 2B:
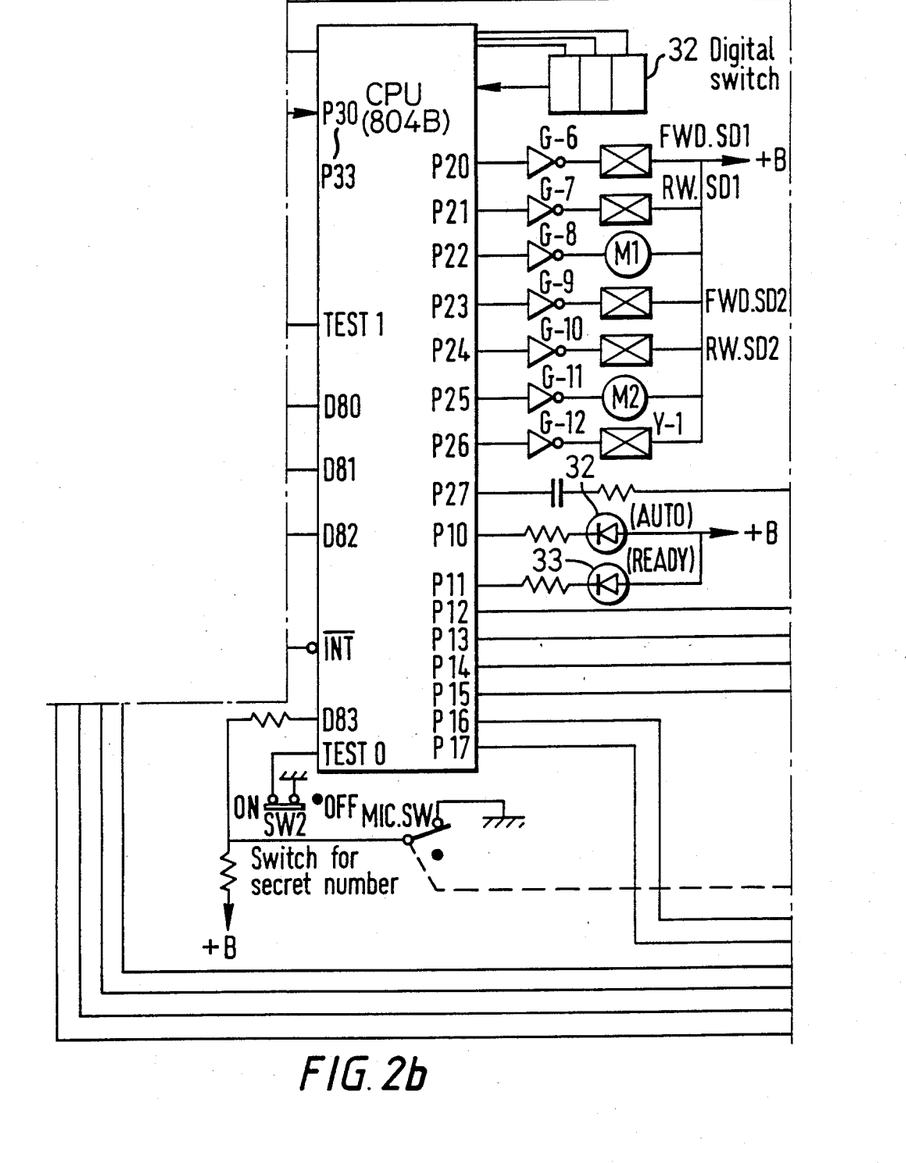
Figure 2C:
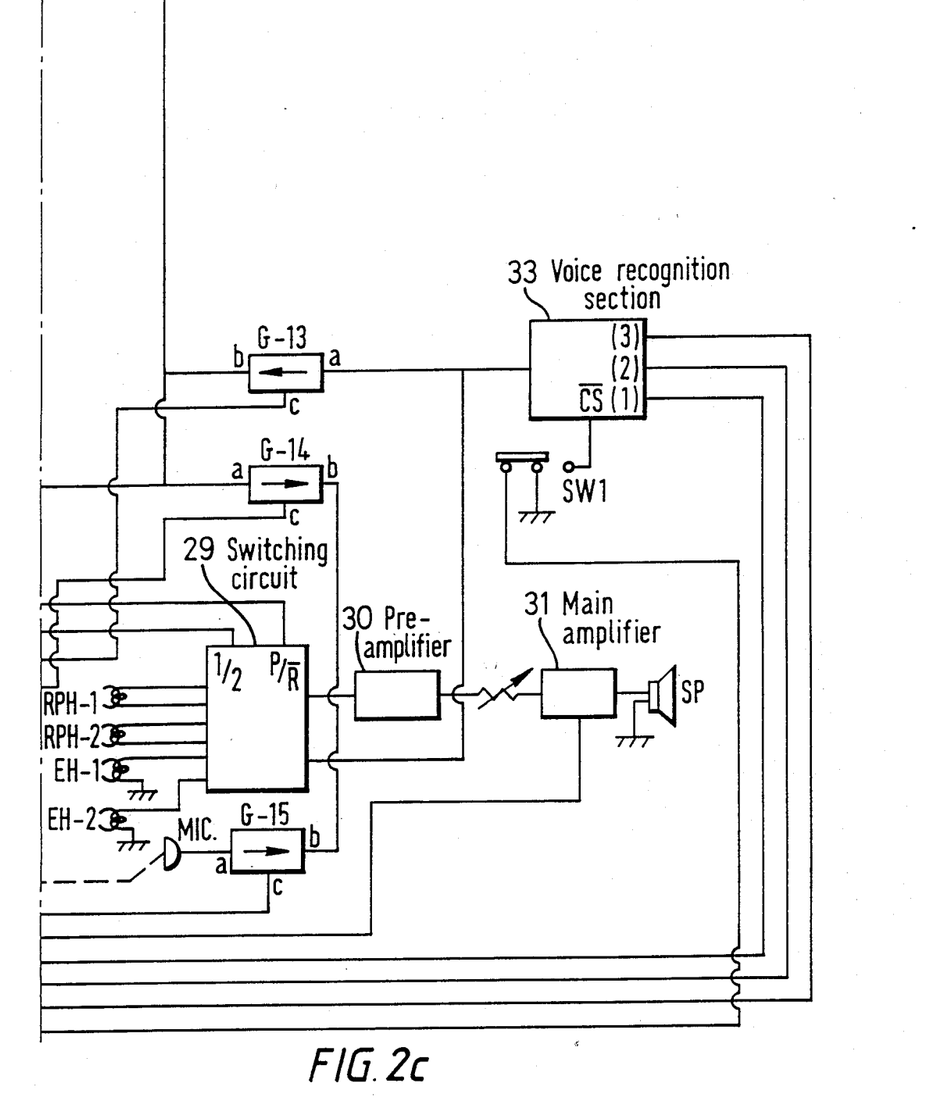

However, according to the present invention as shown in FIG. 2, it is possible to operate the device in the telephone set manually at home in the same way as remote control operation by using some of the buttons on the dialing keypad of a remote pushbutton phone.

Referring to FIG. 2, reference numeral 20 denotes a telephone set wherein only the main part in connection with the present invention is shown in the figure. Reference symbols HS3 and HS4 denote hook switches added to the conventional telephone set, which switch the mode to off-hook or on-hook according to an off-hook button (monitor button), not shown, or the handset. Reference numeral 21 denotes a dialing keypad of the telephone set; 22 denotes a DTMF oscillator of the telephone set; 24 denotes an amplifier for amplifying an output from the DTMF oscillator 22 or a DTMF tone from the remote pushbutton phone by the calling party; and 25 denotes a tone decoder for decoding the DTMF tone, wherein an output terminal (1) generates an H level output while a "1" tone of the DTMF tone is being inputted, and similarly output terminals (2) and (3) generate an H level output, respectively, while each of "2" and "3" tones is being inputted.

The output of (1), (2) and (3) supplies an interrupt to one chip microcomputer through an OR gate G-4. At the same time, the output is applied to input terminals DB0, DB1 and DB2 of the microcomputer through buffers G-1, G-2 and G-3 and a code at the time of the interrupt is discriminated.

Reference symbol CPU denotes a one chip microcomputer (microprocessor), wherein DB0 and DB3 are input terminals, P10 to P17 and P20 to P27 are output terminals (output ports), INT is an interrupt terminal and TEST 1 is an input terminal connected to a counter incorporated in the CPU.

Reference symbols G-6 to G-12 denote drivers; FWD.SD1 and RW.SD1 denote solenoids for forwarding and rewinding an outgoing message (hereinafter called an OGM) recording medium (not shown), respectively; and M1 denotes a motor.

Similarly, reference symbols FWD.SD2 and RW.SD2 denote solenoids for an incoming message (hereinafter called an ICM) recording medium (not shown) and M2 denotes a motor for the ICM recording medium.

Reference symbol Y-1 denotes a relay for engaging telephone lines. Reference numeral 26 denotes a ringing circuit for detecting a ringing signal; and 27 and 28 denote beginning position detection circuits for OGM and ICM tapes. The output of the circuits is inputted to the terminal TEST1 of the CPU through an OR gate G-5.

Reference numeral 29 denotes a recording/playback switching circuit of the OGM and ICM tapes, comprising an analog switch and a relay. When an input terminal ½ thereof is at an H level, heads (RPH-1 and EH-1) of the OGM tape are selected and when said terminal ½ is at an L level, heads (RPH-2 and EH-2) of the ICM tape are selected. Further, circuit 29 switches the mode to playback when a terminal P/R is at an H level, and to recording when the terminal P/R is at an L level.

Reference symbol SW1 denotes a switch for selecting whether the device in the telephone set is controlled by the DTMF tone from the pushbutton phone or by voice recognition; and SW2 denotes a switch for selecting whether or not a security code is used in the same way as in the case of remote control operation when the device in the telephone set is manually controlled at home (hereinafter the switch is called a security code switch).

Tape is used in the present embodiment. However, according to the present invention, tape is not always used and it is possible to use a solid-state recording/playback circuit with RAM (random access memory). In this case, components such as a solenoid or motor which require electric power are not necessary, so that it is possible to control the device by a small amount of electric power.

Operations of the invention will be now described.

Figure 3:
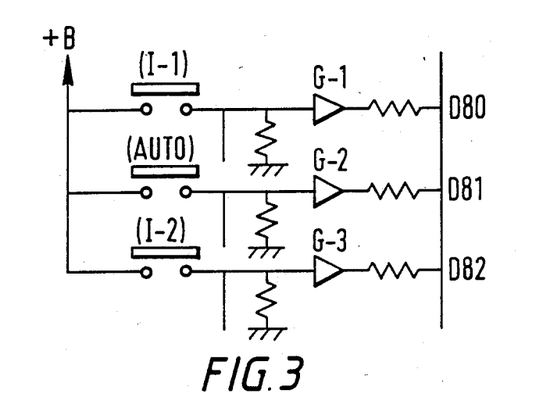
FIG. 3 is a circuit diagram which shows the operation section of a preferred embodiment.

It an embodiment of the present invention, a telephone answering device is included in the telephone set shown in FIG. 2. The basic circuit thereof is disclosed in JAPAN S60-230754 A by the present applicant. In that prior art, operation buttons (t-1), (AUTO), and (t-2) are connected to the input side of the buffers G-1, G-2 and G-3 shown in FIG. 3 of the present invention. When the operation button (t-1) is pushed once, the OGM tape is forwarded at normal speed. When the button is pushed successively twice during a predetermined period of time, the OGM tape is rewound. When the button is pushed successively three times during the predetermined period of time, the OGM tape is fast forwarded. The ICM tape is forwarded at normal speed, rewound and fast forwarded by pushing the operation button (t-2) in the same way as the button (t-1) in case of the OGM tape described above.

In order to drive the OGM or ICM tape in the recording mode, the operation button (AUTO) is pushed once, and then within a predetermined period of time, for instance, within 1.5 seconds, the button (t-1) or (t-2) is pushed once.

In order to set the device to the standby mode for automatically answering and recording, the operation button (AUTO) is only pushed once, then after 1.5 seconds the device is set to the standby mode ready for an incoming call.

When the operation button (AUTO) is pushed once and then within the predetermined period of time the operation button (t-1) or (t-2) is pushed successively twice or three times, the OGM or ICM tape is erased in the rewind or fast forward mode.

In order to release the operation described above, the button for that operation is pushed once.

In the prior art, these three buttons (t-1), (AUTO) and (t-2) are used for the operation described above; whereas in the present invention, the operation buttons (t-1), (AUTO) and (t-2) are omitted and pushbuttons on the telephone set are used commonly for dialing and for operating.

In the present embodiment, key "1" on the dialing keypad 21 shown in FIG. 2 corresponds to operation button (t-1), key "2" to button (AUTO), and key "3" to button (t-2).

Manual operation at home will now be described.

It is assumed that the OGM and ICM tapes (not shown) are not driven when power is supplied to the present device, and that the handset (not shown) of the telephone set 20 is on hook.

Operation for forwarding at normal speed, for instance, the OGM tape will be now described. If the security code switch SW2 is turned on before the operation, a three-digit security code which is predetermined in a digital switch 32, for instance, "123", is entered by operating the keys on the dialing keypad 21.

This security code is same as a security code for remote control operation described later, which is known only to an owner of the present device. Even if a third party operates the present telephone set erroneously for dialing when the security code switch SW2 is turned on, it is possible to prevent the telephone answering device in the telephone set from erroneously operating and leaking the message.

In order to forward the OGM tape at normal speed when the device is in the standby mode, the security code is entered as described above, then the key "1" on the dialing keypad 21 is pushed once. The universal DTMF oscillator generates two frequencies, 697 Hz and 1209 Hz, in response to pushing of the key. These frequencies are converted to a suitable level by a resistor R21 and then amplified by an amplifier 24. The output thereof is applied to a tone decoder 25. The tone decoder 25 comprises an IC for tone decoding, a gate IC and a three-state buffer for preventing any confusion of output from a voice recognition section 33 described above. The output of the tone decoder is activated when the switch SW1 slides to the left side as shown in the figure. Thus while the DTMF tone of the key "1" is being applied to the tone decoder, an H level signal is output from an output terminal (1) of the tone decoder 25 and the interrupt is supplied to the CPU through the OR gate G-4. At the same time, the output thereof brings the input terminal DB0 to the H level through the buffer G-1.

A program, not shown, now checks how many times the input terminal DB0 is brought to the H level in a predetermined period of time, for instance, within 1 second (described later). If the input terminal DB0 is turned into the H level once, the output ports P20 and P22 are turned into the H level, the solenoid FWD.SD1 and the motor M1 are energized and the OGM tape is forwarded at normal speed.

If the input terminal DB0 is brought to the H level twice in the predetermined period of time, the OGM tape is rewound. If the terminal is brought to the H level three times or more, the OGM tape is fast forwarded.

When the key "3" on the dialing keypad 21 is pushed, the DTMF oscillator 22 generates two frequencies, 697 Hz and 1477 Hz. These frequencies are amplified by the amplifier 24 and an output terminal (3) of the tone decoder 25 is brought to the H level. Thus the input terminal DB2 of the CPU is brought to the H level by the output thereof through the buffer G-3. In the same way, as in case of above input terminal DB0, it is checked how many times the input terminal DB2 is brought to the level so that the ICM tape is controlled to forward at normal speed, rewind and fast forward.

The predetermined period of time of 1 second is initialized to newly set a period of 1 second each time the key on the dialing key 21 is pushed, so that it is possible to easily operate, also in the remote control operation described later.

When the key "2" on the dialing keypad 21 is pushed, the DTMF oscillator 22 generates two frequencies, 697 Hz and 1336 Hz. An output terminal (2) of the tone decoder 25 is brought to the H level through the amplifier 24. Thus, when the input terminal DB1 of the CPU is brought to the H level through the buffer G-2, the program flickers an light-emitting diode 32 (AUTO), for instance, for 1.5 seconds. Alternatively, an intermittent signal is generated by the output port P27 and amplified by a speaker SP through an analog switch G-14 and amplifiers 30 and 31.

While the light-emitting diode is flickering as described above, if the key "1" on the dialing keypad 21 is pushed once the OGM tape is set to the recording mode, and if the key "3" is pushed once the ICM tape is set to the recording mode. When the keys "1" and "3" are pushed the predetermined time in the same way as in the prior art, the tapes can be erased in the rewind or fast forward mode.

If any button is not pushed when the light-emitting diode 32 (AUTO) is flickering, as described above, the device is set to the standby mode for automatic answering and recording in the same way as in the prior art. From this time the light-emitting diode 32 is lighting up continuously to indicate that the device is in the standby mode. Similarly, when the OGM tape is rewound and has reached the beginning position thereof, a light-emitting diode 33 (READY) is lit.

If a predetermined period of time, for instance, 30 seconds, has elapsed after the device is set to the standby mode as described above or the OGM and the ICM tapes stop, the entering of security code is cleared. The security code thus should be entered again by pushing keys on the dialing keypad 21 for the next operation.

Operations of the device in the automatic answering and recording mode will now be described.

When an incoming call is received in the standby mode, the ringing signal is detected by the ringing circuit 26 and inputted into the input terminal TEST1 of the CPU through an OR gate G-5. The input terminal TEST1, which is connected to a counter in the CPU, counts the number of AC waves of the ringing signal. If it is decided to be a ringing signal, the output port P26 is brought to the H level and the relay Y-1 is kept energized. The telephone line is engaged through a contact Y1-1 of the relay Y-1.

Accordingly, the ringing signal stops and the off-hook mode is established. At the same time, the output ports P20 and P22 brought to the H level and the solenoid FWD.SD1 and the motor M1 are energized to forward the OGM tape (not shown) at normal speed.

The OGM is played back by the recording/playback head RPH-1 and reached to a line transformer LT through the switching circuit 29, a pre-amplifier 30 and an analog switch G-13 (energized by the program) to be sent out to the calling party.

When the sending of the OGM is completed, the DTMF tone of the key "1" is recorded for a short period of time at the end of the OGM because the key "1" is pushed at the stop of the recording. When the DTMF tone is detected by the CPU through the line transformer LT, a resistor R22, the amplifier 24 and the tone decoder 25, the OGM tape stops and the ICM tape is driven in the recording mode.

Accordingly, the ICM from the calling party reaches the recording/playback head RPH-2 through the line transformer LT, the analog switch G-14 which is turned on by the program, the pre-amplifier 30 and the switching circuit 29 which is switched to the recording mode by the program. Then the ICM is recorded on the ICM tape.

When the calling party hangs up after speaking his or her message, the line voltage changes. The line voltage change is detected by the CPU through the ringing circuit 26 and the OR gate G-5, and then the relay Y-1 is de-energized to disengage the telephone line. At the same time, the ICM tape stops and then the OGM tape is rewound to the beginning position, so that the device returns to the standby mode.

Remote control operation by the owner at a remote location will be now described. Assume that the present device is called by the owner from an outside pushbutton phone.

A three-digit security code predetermined by the digital switch 32 is sent out to the device by pushbutton operation of the phone during the OGM or after the ICM tape is switched to the recording mode.

If the security code sent by the owner does not coincide with the predetermined security code, the device returns to the standby mode. If the two security codes coincide, the OGM or ICM tape stops and the device is ready for receiving the remote control signal for the next operation.

Remote control operation thereafter is the same as the above manual operation at home, also with same keys on the keypad. More particularly, in order to play back the ICM recorded on the ICM tape, the key "3" of the outside pushbutton phone is pushed successively twice to rewind the ICM tape. In response to the pushing, the ICM tape is rewound to and stops at the beginning position of the tape or of the ICM which is not played back yet. In order to stop the ICM tape during rewinding, the key "3" is pushed once.

In order to play back the ICM tape, the key "3" on the pushbutton phone is pushed once after the ICM tape stops as described above. In order to stop the playback of the ICM tape, the key "3" is pushed once. Alternatively, it is possible to automatically stop the ICM tape at the end position of the ICM if the position is stored in a memory of the CPU.

In order to switch to the recording mode, the key "2" on the pushbutton phone is pushed once. In the above manual operation the light-emitting diode 32 flickers whereas in the remote control operation the intermittent signal is output for 1.5 seconds from the output port P27 of the CPU. While the intermittent signal is being heard, if the key "1" on the pushbutton phone is pushed once, the OGM tape is switched to the recording mode and if the key "3" is pushed once, the ICM tape is switched to the recording mode.

In the OGM tape recording mode, the OGM can be recorded again. In the ICM tape recording mode, the index message of date, time or the like can be recorded by the owner after all the ICMs are played back.

As described above, the present embodiment uses the same operation as in the prior art Japan S60-230754 A. However, it is not necessary to always use that operation. It is possible to use any key on the dialing keypad for ICM tape operation to easily operate, for instance, key "1" for ICM tape playback and stopping thereof, key "3" for the ICM tape back space, the key "7" for OGM recording and stopping thereof and key "9" for OGM playback and stop thereof. Of course, the keys are used commonly for remote control operation and manual operation at home according to the purpose of the present invention.

This device controls the device in the telephone set by pushbutton telephone tones, as above. However, it is improper if the device in the telephone set is misoperated by dial operation when another party is called. Accordingly, this invention considers how to cope with the above problem. Namely, in FIG. 2, when the handset (not shown) of the telephone set 20 is picked up to enable operation of the dial, the hook switches HS3, HS4 are closed. The output from the DTMF circuit 22 which oscillates by operation of the dial key 21 by the hook switch HS3, is applied to the output circuit 23, and is output to the telephone line, after this output is amplified by the output circuit 23. The input side of the amplifier 24 is grounded by the hook switch 4, and as a result, the output from the DTMF circuit is not applied to the tone decoder section 25.

The device in the telephone set, in this example, the telephone answering device, thus is not misoperated. But, in the above example, for example when the conversation of each party is recorded on the ICM tape, after the other party is called and talking over the telephone is set, the DTMF tone is not applied to the tone decoder 25. Accordingly, it is impossible to control the ICM tape.

Figure 4:
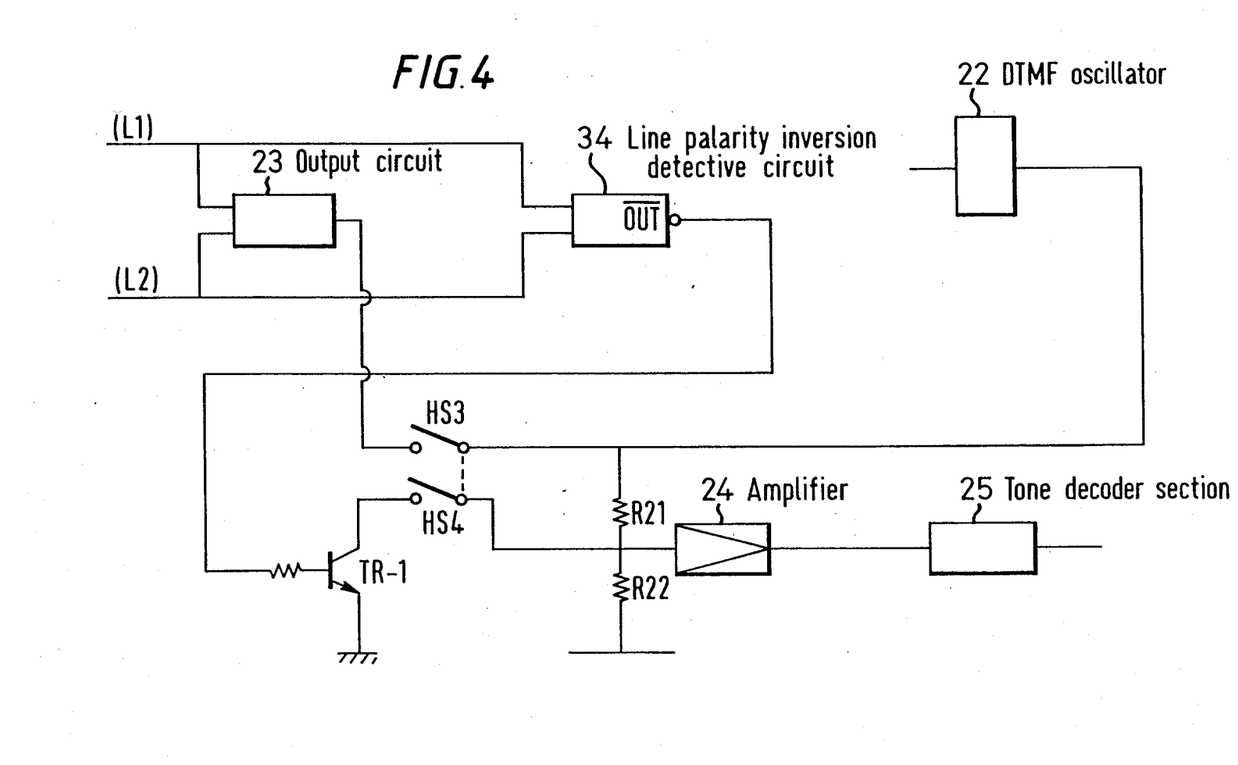
FIG. 4 is a circuit diagram which shows details of another preferred embodiment.

FIG. 4 is a circuit example which solves the above problem. The device in the telephone set is not operated by dial operation to call the other party from the device. After the other party responds and talking over the telephone is set, the device in the telephone set can be controlled by telephone pushbutton operation by the party.

In FIG. 4, a circuit and a part which are added in FIG. 2 are explained as follows. 34 is a line polarity inversion detector circuit. When the condition of talking over the telephone is set by inverting polarity of the telephone line by the response from the other party, the output OUT changes from the H level to the L level, and the output OUT returns to the H level by going on-hook by the other party. This circuit is made of various well-known circuits which use an operational amplifier or a photo-coupler, etc. TR-1 means a transistor. The transistor TR-1 keeps energized by an output from the line polarity inversion detector circuit 34, except in the condition of talking over the telephone. Accordingly, when the handset (not shown) is picked up from the device to call the other party, the hook switches HS3, HS4 are closed, and the transistor TR-1 keeps energized a condition of ON by the output from the line polarity inversion detector circuit 34 while there is dialing operation. As a result, the input side of the amplifier 24 is grounded through the closed hook switch HS4. As a result, the DTMF tone by dialing operation does not reach the tone decoder 25, and the device in the telephone set is not mis-operated.

In the condition of talking over the telephone where the output from the line polarity inversion detective circuit 34 changes from the H level to the L level, the transistor TR-1 is de-energized. As a result, the amplifier 24 becomes active, the DTMF tone by pushbutton operation of the telephone by the party, reaches the CPU (central processing unit) through the tone decoder 25. As a result, the DTMF tone can control the device in the telephone set.

In accordance with the same principle as described above, it is possible to arrange that even if the incoming call is received and the off-hook mode is established, reception of incoming call can be stored and the device in the telephone set can be controlled in response to the operation of either the calling party or the called party while the called party hangs on, more particularly during the conversation between the parties. It is also possible to arrange a special recording button as a substitute for the above pushbutton phone keys, which is operated only during above two-way conversation, so as to stop the two-way conversation recording when the off-hook mode is released.

The device has a "speed dial" section. Therein, a "code" which controls a dial number or the device in the telephone set can be stored in a memory of the CPU. The "code" is, for example, a security code that is sent when a remote controlling operation starts. In this example, the OGM tape and the ICM tape are controlled by the pushing times of buttons "1", "3", but a specific code, for example, the specific code of three figures which resembles the security code, is assigned to various controls, and it is possible to do various tests or various remote controlling operations by the above specific code. Further, it is possible to assign the special code for playing back or recording a specific message. Also, the special code is stored in the speed dial section, and as a result, it is possible to put to practical use or to test the remote control by touching once or twice the pushbutton phone (dial key).

In order to register the security code or the special code in the speed dial section, the button in the dial button section 21 is pushed in the order of "X*YYY". "X" means a number which shows the order of registration by key 0-9. "YYY" means, for example, the security code or the special code of three figures 0-9. When a program detects the DTMF tone of "*", which is made by pushing the above keys, the program regards the number input before as the number which means the registration number, and designates by address a memory field assigned by the registration number in the CPU. Then the number of three figures which is input after "*", is stored in the memory field.

In order to read out the code stored as above, buttons of "X", "#" are pushed, wherein "X" means the registration number. When the program detects the DTMF tone of "X", "#", the address of the memory is designated by contents of the DTMF tone. The code of three figures is read out, and is output by the DTMF tone. If ten buttons are set at the input port (not shown) in the CPU, read out of the speed dial is done by touching once.

Figure 5A:
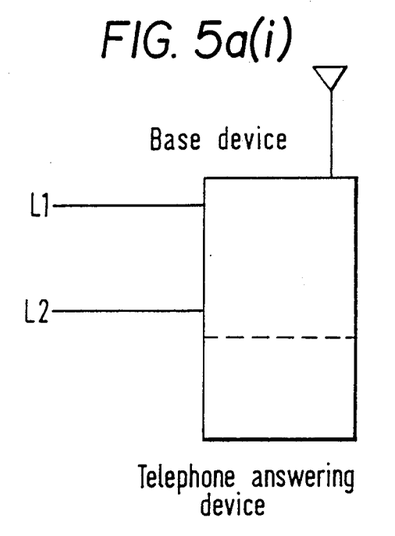

This invention is also available for a cordless phone. In the conventional cordless phone, a base device and a separate device are set separately as shown in FIG. 5a. When a calling is received by the base device, a bell in the base device or the separate device is activated. A user having the separate device can talk over the telephone through the base device by the off-hook operation of the separate device. And by picking up the separate device the user can dial so as to make an outgoing call through the base device. with a calling party. Accordingly, in receiving or transmitting calls, a signal from the separate device during off-hook operation of the device, is received by the base device, and the telephone lines L1, L2 are closed. As a result, the device in the base device, for example, only a telephone answering device, could not be controlled by the separate device when it is independent of the telephone line.

This invention offers two approaches to solve the above problem. First, an electric signal which is modulated by the DTMF tone is output to the base device, when the keys "1", "2", and "3" are pushed, and the power switch (not shown) becomes ON in an on-hook condition where the hook switch of the separate device shown in FIG. 5a opens. When the key "1" is pushed, two frequencies of 697 Hz and 1209 Hz are usually output, but in the above on-hook condition, an oscillator "A" (not shown) is connected by a switching circuit (not shown) connected with the above hook-switch. As a result, two frequencies of 69 7Hz and 1633 Hz are output.

These two frequencies not yet used in the pushbutton phones in Japan, but same as the two frequencies for the key A. When the key "2" is pushed, two frequencies for the key "B" are output. When the key "3" is pushed, two frequencies for the key "C" are output (FIG. 5b). When each output "A"–"C" is decoded by the tone decoder (not shown) in the base device, the telephone answering device is controlled as above without closing the telephone lines L1, L2. Of course, when the keys "1"–"3" are pushed in an off-hook condition, when the hook switch is closed, the corresponding DTMF tone is output (FIG. 5b). When an owner remote-controls the device by using a remote pushbutton phone, the DTMF tone by "A"–"C" are not output. In this case, the device is programmed so that the remote control operation is done by the DTMF tone of "1"–"3".

This device also has a voice recognition section as shown in FIG. 2. A specific voice of "one", "two", and "three" or other designation, or a security code or a speed dial, is set previously to be registered substituting for the DTMF tone of "1"–"3" by changing the switch SW 1 to the right side. As a result, the OGM tape and the ICM tape can be controlled similar to controlling of the tapes by the DTMF tone.

The second idea is that, for example when "#" on the separate device in the cordless telephone is pushed twice, sending of an electric signal between the base device and the separate device is maintained, and communication between the base device and the telephone line is cut off.

In the above embodiment of this invention, it is possible to relieve an incoming call from the outside telephone even during operating of the device in the telephone set independent of the telephone line. In the above condition, the hook-switch HS2 contacts a ringer circuit in the on-hook condition of the telephone set as shown in FIG. 1. As a result, the telephone set is in the condition which receives a calling signal. If the user hopes to talk over the telephone, the user stops the telephone answering device and then picks up a receiver (not shown). It is then possible to talk to the calling party directly over the telephone. If the user does not hope to talk over the telephone, the user lets the telephone answering device alone, or changes the telephone answering device to the automatic answering/recording mode. So it is possible to let the telephone device respond to the received call, after the OGM tape or the ICM tape is set to the beginning position. In the cordless phone, when the device in the base device is controlled by the separate device, a calling signal must be received.

Tape is used in this example as above, but in a solid-state recording/playback device, an action corresponding to rewinding or fast forwarding is carried out momentarily. Accordingly, when the key is operated continuously twice by using the solid-state recording/playback device, one message is rewound in the solid-state recording/playback device and the solid-state recording/playback device stops. When the key is operated continuously three times, one message is skipped and the solid-state recording/playback device stops.

Figure 6:
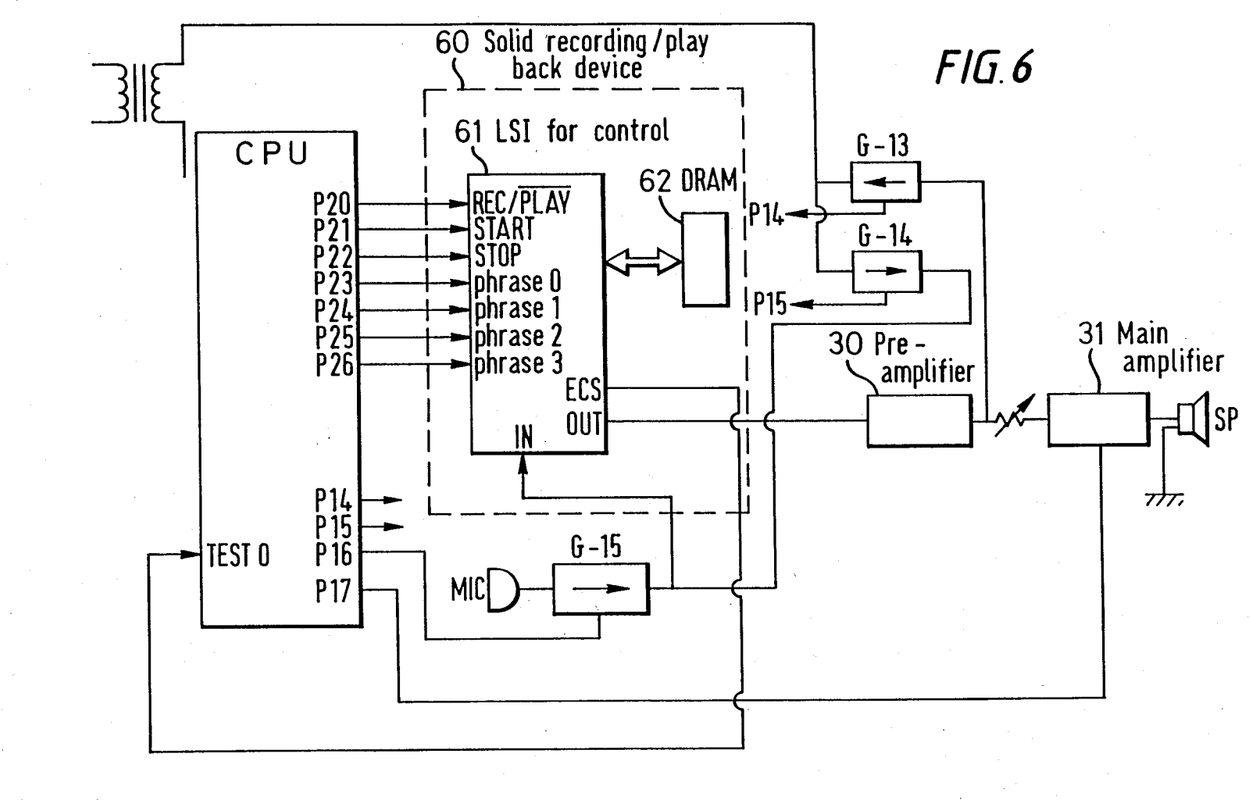
FIG. 6 is a circuit diagram of the main part including a solid-state recording/playback device.

FIG. 6 shows a circuit diagram of a solid-state recording/playback device. Therein, 60 is the solid-state recording/playback device. The solid-state recording/play back device 60 is made of an LSI (large scale integration) device for control 61, and a DRAM (dynamic random access memory) 62. T6668 made by TOSHIBA is used as the above LSI for control, and T6668 has been already on the market.

In the main terminal, "REC/PLAY" is a changing terminal for recording, play back. The changing terminal is set at a recording mode by an H level and a playback mode by an L level. "START" is a terminal for start of operation of recording, playback. "STOP" is a terminal for stop of operation of recording, playback. Phrases 0 to 4 are terminals to select a phrase. One phrase is made by 4 bits, accordingly it is possible to use 16 phrase at a maximum. "IN" is an input terminal of voice. "OUT" is an output terminal of voice. "EOS" is an output terminal which outputs an H level when the end of each phrase is detected.

In order to record an answering message in the solid-state recording/playback device, the same operation as the operation of tape is done. Namely, after the key "2" in the dial key 21 in the FIG. 1 is pushed, the key "3" is pushed. The program sets the output port "P23, P24, P25, P26" to "1000", and the first phrase is assigned as the answering message. At the same time, in a condition where the output port P20 is set at the H level, a recording mode is selected. At the same time, the output port P16 is set at the H level, an analog switch G-15 is set at "ON" and the microphone MIC is set.

In the condition of the above, when a start pulse from the output port P21 is output, the answering message which is received by the microphone MIC is input to the LSI for control 61 through the input terminal IN and a digital voice which is converted by the A/D converter set in the LSI for control, is stored in the DRAM 62. After set of the answering message is finished, the key "1" is pushed once as setting by the tape.

When the program detects the pushing, a stop pulse from the output port P22 is output, and solves the recording operation. When the start pulse or the stop pulse is output, the LSI for control 61 stores the start address, the stop address of each phrase in the memory set in the LSI for control, and when all of the stop address or a full DRAM is detected, the output terminal EOS (end of speech) is set at the H level. Accordingly, the key "1" is pushed once to confirm the OGM recorded as in the above. As a result, the output port P20 is set at the L level, and changes to play back mode. Also as in the above, when the start pulse is output after the first phrase is selected, the OGM is played back from the start of message, and the OGM is spoken by the speaker SP through the output terminal OUT, the pre-amplifier 30 and the main amplifier 31. When the OGM reaches the end, the LSI for control sets the output terminal EOS at the H level, and stops play back operation automatically.

In automatic answering recording mode, in order to send the OGM, the output played back as in the above is sent to telephone line through the analog switch G-13. In order to record the message from the calling party, the next phrase is selected by the output ports P23-P26 and the analog switch G-14 is set to ON. It is possible to record in the same way as the recording of the OGM. Namely, when the calling party hangs up, the stop pulse is output.

In remote control, in order to play back the ICM, after the next phrase of the OGM is designated, the start pulse is output in the play back mode. When the phrase reaches the end, the output terminal EOS is set at the H level (the output terminal EOS is returned to the L level by the start pulse). When the H level is detected by the CPU, the program changes the phrase to the next phrase, and plays back all received messages automatically.

In the above example, the telephone answering device as the device in the telephone set is explained, but this application is not limited to a telephone answering device. For example it is possible to use the invention in the transmission of information which is shown in "THE SYSTEM OF RECEIVING INFORMATION BY USING PUSH PHONE" (Japanese patent application Ser. No. 58-188732, Publication No. 60-80354) by the same applicant. Namely, the following explanation is not shown in the figure, but in the on-hook condition of the telephone set, an easy sentence made of numbers or the alphabet is made by key operation of the dial key, and is stored in a memory. The telephone set is set on-hook and the other party is called by dial operation. When talking over the telephone is set as in the above, it is possible to control the device in the telephone set. When one of the dial key or other specific key is pushed, a sentence made of numbers or the alphabet stored in the memory, is sent to the other party automatically at a predetermined speed. It is possible to apply this invention to the above device.

As in the above, it is possible to make various signals for control of a solid-state recording/play back device having a function of solid-state recording set in the device in a telephone set or a telephone answering device or a recording/play back device having a small mechanical recording/play back device by the functions of on-hook dial and the off-hook dial of the conventional telephone set having various functions. As a result, when each function whose part of machinery becomes small and of the telephone having various functions which is changing to solid-state recording device without tape, is controlled, the buttons on the surface of the telephone having various functions must have various functions, for example, functions of redial, amplified voice, and one-touch or speed dial. This invention presents a means for reducing to a minimum the number of buttons in general by using an operating button of the device in common.

The scope of practical application is wide. Namely, in the embodiment, when the device in the telephone set is controlled manually or the device in the telephone set is controlled by remote control, the buttons "1", "2", "3" are used; however, the embodiment shows that it is possible to use and distribute all the pushbutton telephone keys to operate a more complex operation for some device. However, the conventional telephone answering device in telephone sets which are on the market has a difference between operation by remote-control and by manual control. As a result, the operator needs time to learn how to control the device. This was a big problem so that distribution of the device was limited. Accordingly, the principle of this invention can cope with the above problem. This invention is very effective practically.

What is claimed is:

1. Telephone equipment with multiple functions capable of operating off-hook dialing following picking up of a handset of a phone and on-hook dialing by turning on a special off-hook switch of the phone, using a DTMF (dual-tone multifrequency) tone, and incorporating an additional device that can be controlled (1) by remote control by signals from an external source over an outside telephone line by pushing DTMF tone buttons of the external source, and (2) manually and independently of the outside telephone line by pushing DTMF tone buttons of said equipment of the same numeral or sign as those for remote control operation of the additional device over the outside telephone line, said equipment including circuitry for automatically making the additional device independent of the outside telephone line during an off-hook dialing operation of said telephone equipment for placing an outgoing call, and thereafter during the time a talking circuit on the telephone line is established by the outgoing call, enabling said additional device to be controlled either by a calling party by a remote control operation or by a called party.

2. The telephone equipment of claim 1, wherein said equipment includes a cordless telephone.

3. The telephone equipment of claim 1, including means for visually or audibly indicating when a particular DTMF tone button is pushed.

4. Telephone equipment in accordance with claim 1, wherein said additional device comprises a telephone answering device (TAD), wherein said equipment includes means for enabling said TAD to be controlled by particular groups of several DTMF tones in succession representing particular TAD functions, by pushing special DTMF buttons for one-touch, or speed, dialing, to provide said DTMF tone groups.

5. Telephone equipment in accordance with claim 1, wherein said additional device includes voice recognition circuitry for controlling said additional device in response to a voice command.

6. Telephone equipment with multiple functions capable of operating off-hook dialing following picking up of a handset of a phone and on-hook dialing by turning on a special off-hook switch of the phone, using a DTMF (dual-tone multifrequency) tone, and incorporating an additional device that can be controlled (1) by remote control by signals from an external source over an outside telephone line by pushing DTMF tone buttons of the external source, and (2) manually and independently of the outside telephone line by pushing DTMF tone buttons of said equipment of the same numeral or sign as those for remote control operation of the additional device over the outside telephone line, said equipment including circuitry for automatically making the additional device independent of the outside telephone line during an off-hook dialing operation of said telephone equipment for placing an outgoing call, and thereafter during the time a talking circuit on the telephone lines is established by the outgoing call, enabling said additional device to be controlled either by a calling party by a remote control operation or by a called party, wherein said additional device comprises a telephone answering device (TAD), said TAD including a special switch for enabling said TAD to record a two-way conversation between a calling party and a called party, and further including means for automatically turning off said switch when the handset of the telephone equipment is returned on-hook after the conversation is completed.

* * * * *